E. O. SCHWEITZER.
OVERLOAD CIRCUIT BREAKING APPARATUS.
APPLICATION FILED MAY 19, 1913.
1,211,967. Patented Jan. 9, 1917.
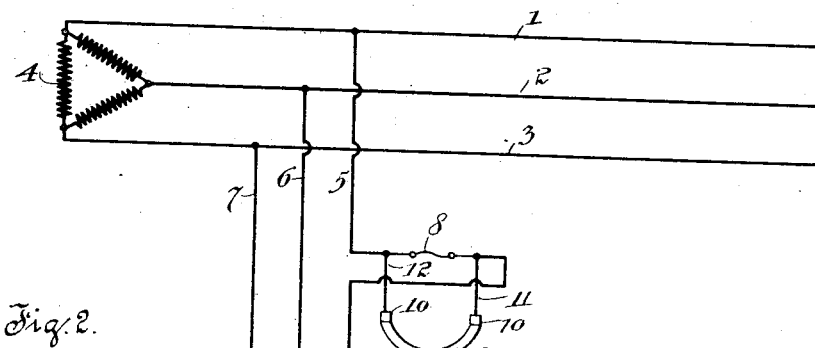
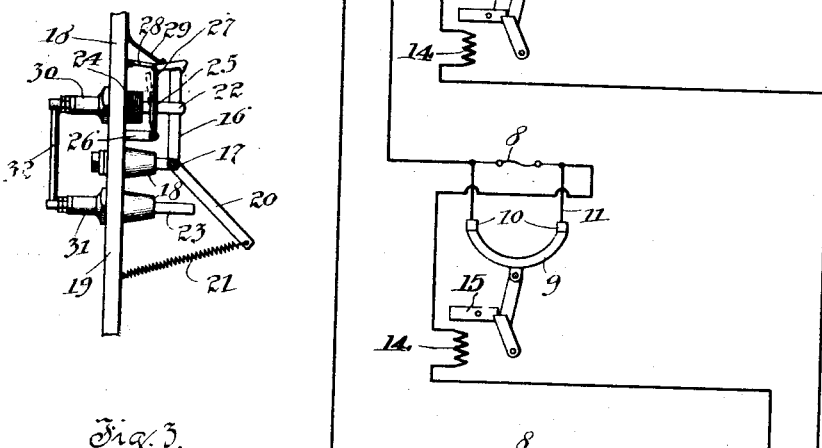
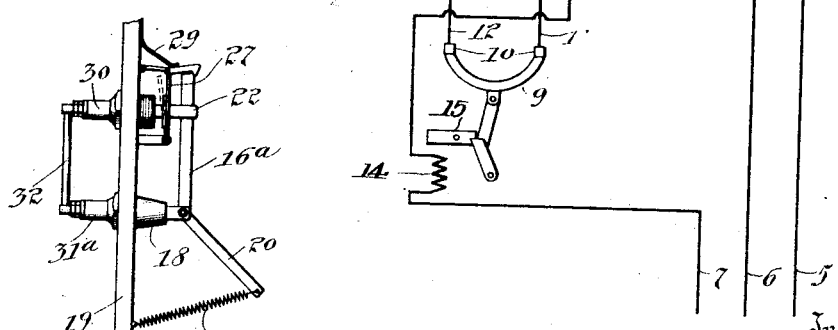
Witnesses
Arthur W. Carlson
Robert F. Weir
Inventor
Edmund O. Schweitzer

UNITED STATES PATENT OFFICE.

EDMUND O. SCHWEITZER, OF CHICAGO, ILLINOIS.

OVERLOAD CIRCUIT-BREAKING APPARATUS.

1,211,967. Specification of Letters Patent. Patented Jan. 9, 1917.

Application filed May 19, 1913. Serial No. 768,577.

*To all whom it may concern:*

Be it known that I, EDMUND O. SCHWEITZER, a citizen of the United States, residing at Chicago, in the county of Cook and State of Illinois, have invented a certain new and useful Improvement in Overload Circuit-Breaking Apparatus, of which the following is a full, clear, concise, and exact description, reference being had to the accompanying drawings, forming a part of this specification.

My invention relates to overload circuit breaking apparatus.

Prominent objects of the invention are to provide a simple, practical and efficient overload circuit breaking arrangement; to secure quickness and accuracy of operation; to minimize the arcing and destructive effect when the circuit is broken; to insure reliability and certainty of operation; and to secure the foregoing and other desirable results in a simple and expeditious manner.

In the accompanying drawings, Figure 1 is a diagrammatic view of a 3-phase power or lighting circuit provided with overload circuit breaking apparatus embodying my invention; Figs. 2 and 3 are views of a modified form of apparatus.

In the drawings I have shown three line conductors, 1, 2 and 3, representing the three lines or conductors of a 3-phase system supplied by a dynamo or generator 4. 5, 6 and 7 are other line conductors leading off from the conductors 1, 2 and 3, the conductors 5, 6 and 7 being understood to run to some suitable translating device or other apparatus requiring overload current protection. Each of the lines 5, 6 and 7, I show equipped with overload circuit breaking apparatus involving my present invention. I show in connection with line or conductor 5, for example, a fuse 7, which is of very low carrying capacity, preferably in fact a very small per cent. of the entire carrying capacity of the load carried by conductor 5. I also show a circuit breaker 9 which may be any suitable or desirable type of commercial circuit breaker. The contacts 10—10 of this circuit breaker are connected by wires 11, and 12 with the line 5, so that said fuse 8 is in shunt with the circuit breaker. The operating solenoid 14 of the circuit breaker I show connected in series with the line conductor 5, this solenoid 14 acting upon tripping mechanism 15 to operate the circuit breaker when a predetermined overload traverses the conductor 5. Thus it will be seen that whenever a predetermined or sufficient overload passes in the line 5, the solenoid 14 will actuate the circuit breaker 9 and thereby open the circuit across the contacts 10—10, whereupon the entire current will be thrown upon the fuse 8, thereby operating or blowing said fuse instantaneously, the fuse having a relatively small carrying capacity. The other lines 6 and 7, I show also provided with fuses 8—8 and circuit breakers 9—9 connected and operating as described in connection with line 5. It will be seen that reliability, certainty, and quickness of action are secured, the circuit breaker operating quickly when a predetermined overload is reached and then the fuse operating. Thus with a low voltage circuit breaker of small and cheap design, and a low capacity fuse of high voltage, a very rapidly operating mechanism is obtained with reliability of action and low maintenance cost. It will be seen at the same time that the arcing effect is taken care of by the character of the arrangement of circuit breaker and fuse, and protection for the translating apparatus on the line is thereby insured, for the circuit breaker with its tripping coil in the primary circuit is more responsive and will operate more quickly than the usual oil switch and tripping mechanism at the generating station. This insures against such first operation of the circuit breaking mechanism at the generating station, with consequent ill effects upon the service given other loads connected to the same circuit.

When desired, the circuit breaker may be immersed in oil, although as a general rule this is not necessary because there is so little arc. With the arrangement as shown in my invention it is easy and inexpensive to replace the oil since it is contained in a removable cartridge.

In Fig. 2 I show a modified form of apparatus, which embodies a swinging knife switch blade 16 pivoted at 17 to a post 18 secured to an upright support 19. The blade 16 has an extension 20 to which is secured a spring 21 also fastened to the support 19, said spring tending to draw said extension 20 toward the support 19. Spring contact jaws 22 are also mounted upon the upright 19 and arranged to coöperate with the blade 16 and other contact jaws 23 also mounted upon the support 19 are arranged to coöperate with the extension 20. An electromagnet or solenoid 24 is shown mounted upon the support 19, being conveniently associated with the jaws 22 and is provided with an armature 25. This armature 25 is pivotally connected at its lower end to a support 26, and at its upper end constituting a support for the links 27 and 28 which are pivotally connected to one another, by frictionally engaging the under sides of the links at their pivotal points to retain the links in the position disclosed in Fig. 2, it being understood that the link 27 is in the form of a hook or catch to engage the end of the switch blade 16. A spring 29 acts upon the catch 27, tending to hold the same down in engagement with the switch blade 16. Thus the blade 16 is normally held closed in the contacts 22 by the catch 27, but when the solenoid 24 is actuated, and the armature 25 attracted, the catch 27 being shifted due to the action of the spring member 29, so as to disengage the blade 16, thereby permitting the spring 21 to actuate the same and separate the blade 16 from the contacts 22, and cause the extension 20 to connect with the contact jaws 23, the links 27 and 28 having a loose connection with one another and with the armature 25 with sufficient loose motion to permit a slight buckling of the links 27 and 28 so as to cause the release or trip of the blade 16. On the other side of the upright 19 are mounted a pair of posts 30 and 31, which support an inclosed fuse 32. The arrangement is so connected that the solenoid 24 is included in circuit as shown in Fig. 1, and when this solenoid is energized by an overload current and the blade 16 released, the circuit through the blade 16 by way of contact jaws 22 is opened and the fuse 32 is connected in shunt, by the extension 20 meeting the spring jaws 23, the connection to the swinging blade 16 and extension 20 being by way of metal rod through post 18. Thus the operation of this arrangement is very much as the operation of the Fig. 1 apparatus, the switch or circuit breaker being first opened and then a shunt through the fuse being opened.

In Fig. 3 I have shown an arrangement very similar to that of Fig. 2, but instead of having three posts on the upright 19 I have shown in Fig. 3 only two posts, namely the spring jaws 22 and the post 18 to which the switch blade 16ª is pivoted. The fuse 32 is connected with the post 30 as in Fig. 2, and also with a post 31ª being a rear extension of the post 18. Thus a fuse 32 is normally connected in shunt with the circuit breaker or switch, instead of being thrown into shunt by the operation of the switch, as in Fig. 2.

It will be understood that changes and modifications may be made without departing from the spirit of the invention.

What I claim is:

1. The combination of a circuit breaking device having a swinging knife blade, spring contact jaws therefor mounted upon an insulating support, electromagnetic means tending to hold said knife blade normally in position in said contact jaws, spring means tending to open said knife blade, and a fuse mounted on the opposite side of said support and arranged for connection in shunt between the spring contact jaws for said knife blade.

2. A circuit breaking device comprising a support, contact jaws carried by a metallic post which extends through said support and has its opposite end made in the form of a fuse terminal, a swinging blade adapted to engage said contact jaws and mounted upon a post also carried by said support on the same side thereof as said contact jaws, another post mounted on the other side of said support and providing the other fuse terminal on the same side of said support as said first mentioned terminal, a magnet and a trip device controlled by the armature thereof for controlling said blade.

3. A circuit breaking device comprising a support, contact jaws carried by a metallic post which extends through said support and has its opposite end made in the form of a fuse terminal, a swinging blade adapted to engage said contact jaws and mounted upon a post also carried by said support on the same side thereof as said contact jaws, another post mounted on the other side of said support and providing the other fuse terminal on the same side of said support as said first mentioned terminal, a magnet and a trip device controlled by the armature thereof for controlling said blade, said second mentioned fuse terminal post being an extension of the post upon which said swinging blade is mounted.

In witness whereof, I hereunto subscribe my name this 9th day of May, A. D., 1913.

EDMUND O. SCHWEITZER.

Witnesses:
A. MILLER BELFIELD,
A. LYDA JONES.